Aug. 7, 1962  F. E. CHESTNUT  3,047,995
WEED SHREDDER
Filed April 20, 1960  3 Sheets-Sheet 1

Frank E. Chestnut
INVENTOR.

BY *Clarence A. O'Brien*
and *Harvey B. Jacobson*
Attorneys

Aug. 7, 1962
F. E. CHESTNUT
3,047,995
WEED SHREDDER
Filed April 20, 1960
3 Sheets-Sheet 2
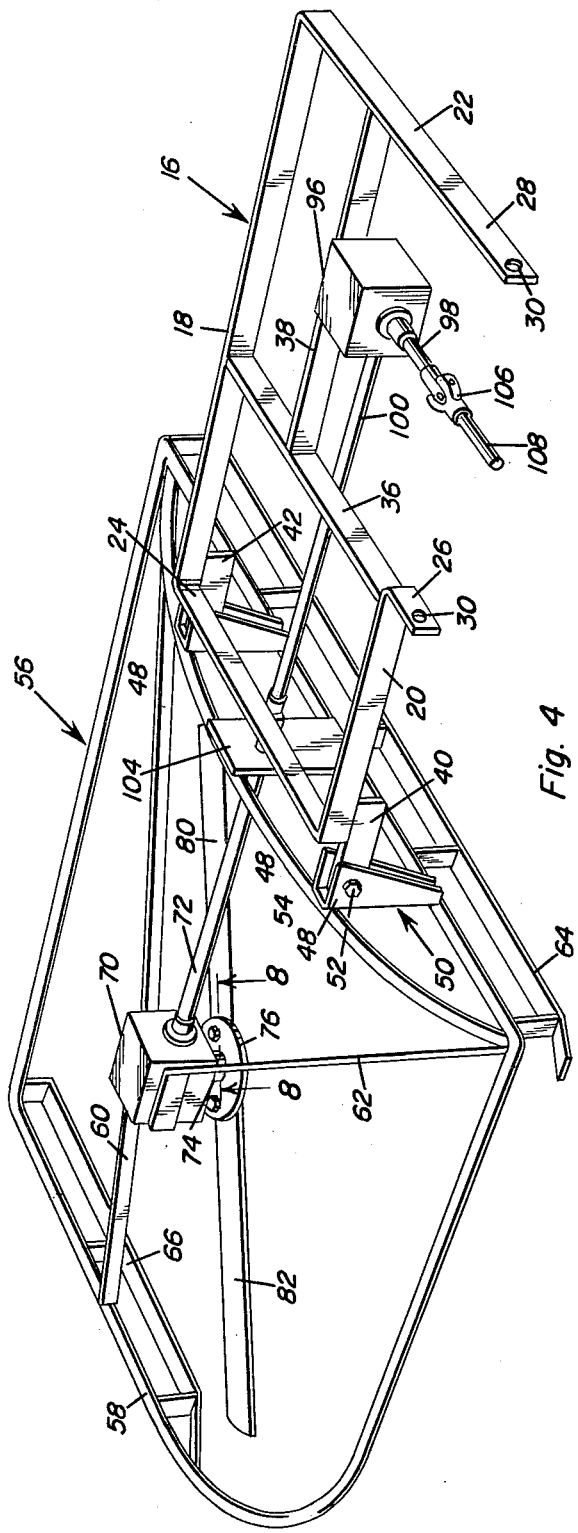
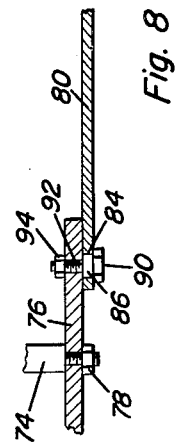
Frank E. Chestnut
INVENTOR.

Aug. 7, 1962  F. E. CHESTNUT  3,047,995
WEED SHREDDER

Filed April 20, 1960  3 Sheets-Sheet 3

Frank E. Chestnut
INVENTOR.

United States Patent Office 3,047,995
Patented Aug. 7, 1962

3,047,995
WEED SHREDDER
Frank E. Chestnut, Rte. 1, Alamo, Tex.
Filed Apr. 20, 1960, Ser. No. 23,546
3 Claims. (Cl. 56—25.4)

This invention relates to a novel and useful weed shredder, and more particularly to a weed shredder which is particularly well adapted for controlling the growth of weeds around low hanging trees and shrubbery.

The weed shredder is adapted for securement to a tractor of the type having either a two point or three point lift hitch and the shredder includes a rotary cutter assembly which projects laterally to one side of the tractor when in the operational position. The weed shredder includes a lift frame which is adapted to be secured to either a two point or three point lift hitch of a tractor. The lift frame when secured to the tractor projects rearwardly therefrom and the cutter assembly or housing is pivotally secured to the lift frame along one side thereof for movement about a longitudinally extending and horizontally disposed axis between a first horizontally disposed position projecting laterally from one side of the lift frame and a second upstanding position projecting upwardly from the same side of the lift frame.

In the past, cutter bar mowers have been utilized to control the growth of grass, weeds and the like under low hanging trees and shrubbery but the cutter bar type of mower merely cuts the tall stalks of grass or weeds and enables the cuttings to fall to the ground in one piece.

It is well known that the rotary mowers not only cut tall weeds and grasses quite effectively, but that they also shred the cuttings into fine pieces before the mower is moved to the next position. The rotary type of mower would therefore be more highly desirable. However, all of the rotary mowers now in use are specifically adapted to trail or to precede the vehicle to which they are attached. This position of a rotary mower relatively to the powering vehicle is, of course, not conducive to cutting tall grasses and weeds from beneath the lower boughs of low hanging trees or shrubs.

It is therefore the main object of this invention to provide a rotary mower which is specifically adapted for securement to either a two point or three point tractor hitch and which is provided with a rotary mower construction that is laterally offset to one side of the tractor to which it is connected.

A further object of this invention, in accordance with the immediately preceding object, is to provide a weed shredder having a lift frame adapted for securement to either a two point or three point lift hitch of a tractor and which will be positioned rearwardly of the tractor when secured thereto and be provided with a rotary mower construction pivotally secured to one side of the lift frame for movement about a longitudinally extending and horizontally disposed axis between a first horizontally disposed position projecting laterally from one side of the lift frame and a second upstanding position projecting upwardly from that same side of the lift frame so that the rotary cutter assembly, when not in use, may be pivoted to an upstanding position so as not to project laterally beyond the sides of the tractor to which it is secured thus enabling the tractor to pass through restricted areas without having to disconnect the weed shredder therefrom. It is to be noted that when the rotary cutter assembly is pivoted to an upstanding position that the lift frame may also be lifted by means of the two point or three point hitch to which it is secured to provide additional ground clearance while the tractor is travelling over rough ground and through narrow places.

Still another object of this invention is to provide a means by which the rotary cutter assembly may be operated even if the tractor to which it is secured is slightly inclined about its longitudinal axis toward the laterally projecting cutter assembly.

And a final object to be specifically enumerated herein is to provide a weed shredder which will conform to conventional forms of manufacture, be of simple construction and easy to operate so as to provide a device that will be economically feasible, long-lasting and operable by substantially every person capable of operating a tractor.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is an enlarged perspective view of the weed shredder shown with the protective cover of the cutter housing removed;

FIGURE 8 is an enlarged fragmentary vertical sectional view taken substantially upon the plane indicated by the section line 8—8 of FIGURE 4.

Figure 5:
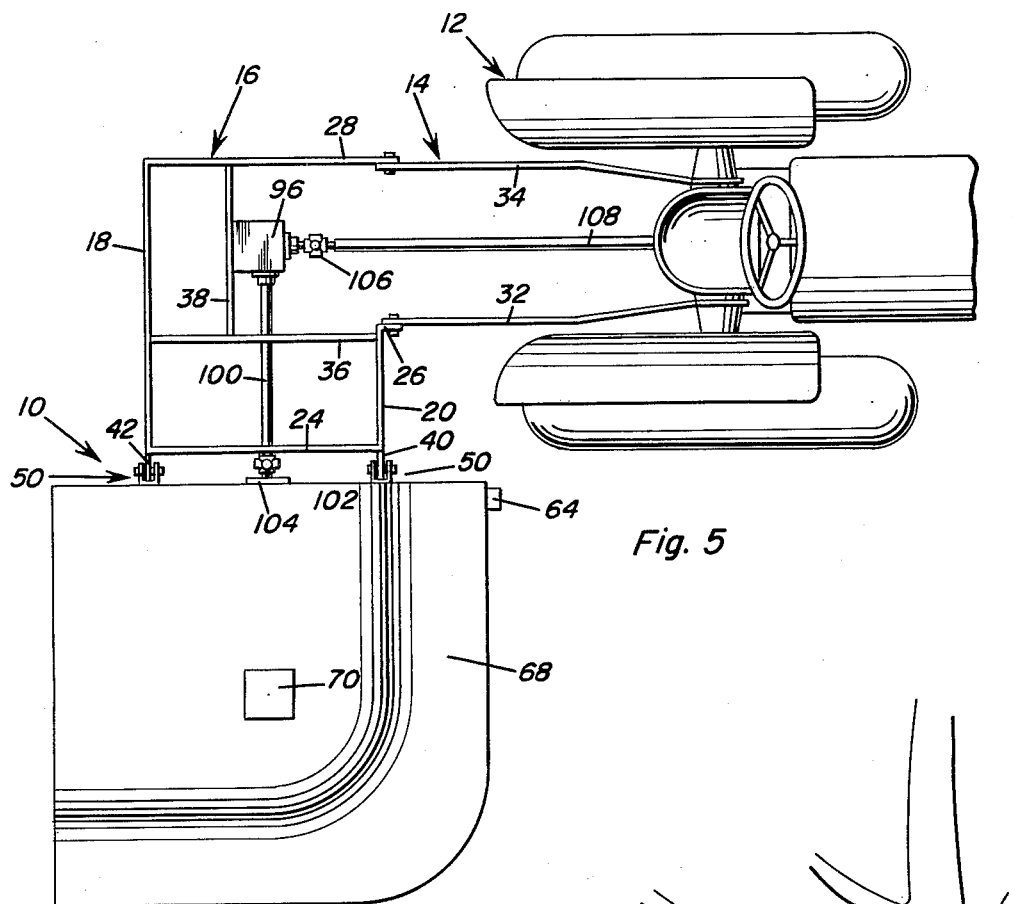
FIGURE 5 is a top plan view of the weed shredder shown attached to a two point hitch carried by the rear of a tractor.
Figure 6:
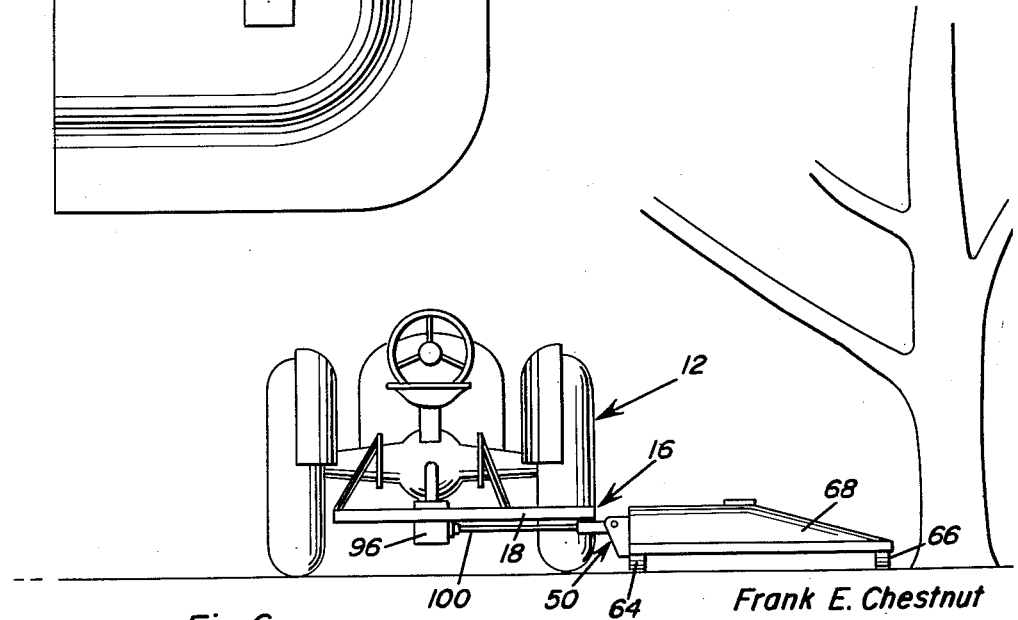
FIGURE 6 is an end elevational view of the attachment as seen from the left side of FIGURE 5 showing the manner in which the cutter assembly of the weed shredder is adapted for controlling the growth of weeds and grasses beneath low hanging limbs.

Referring now more specifically to the drawings, the numeral 10 generally designates the weed shredder comprising the instant invention which is shown in FIGURES 5 and 6 of the drawings secured to the rear of a tractor generally designated by the reference numeral 12 by means of a two point hitch generally referred to by the reference numeral 14.

With particular reference now to FIGURE 4 of the drawings it will be noted that the weed shredder includes a lift frame generally designated by the reference numeral 16 which is substantially rectangular in plan and includes front and rear members 18 and 20 and opposite side members 22 and 24. The lift frame 16 includes a pair of forwardly directed mounting arms 26 and 28 which mounting arms are formed integrally with the member 20 and the member 22 respectively. The forward ends of the arms 26 and 28 are apertured as at 30 for securement to the apertured rear ends of the arms 32 and 34 of the two point lift 14. The lift frame 16 also includes suitable cross bracing 36 and 38 for providing the desired rigidity.

A pair of mounting arms 40 and 42 are secured to members 20 and 18, respectively, and project beyond the side member 24.

Figure 1:
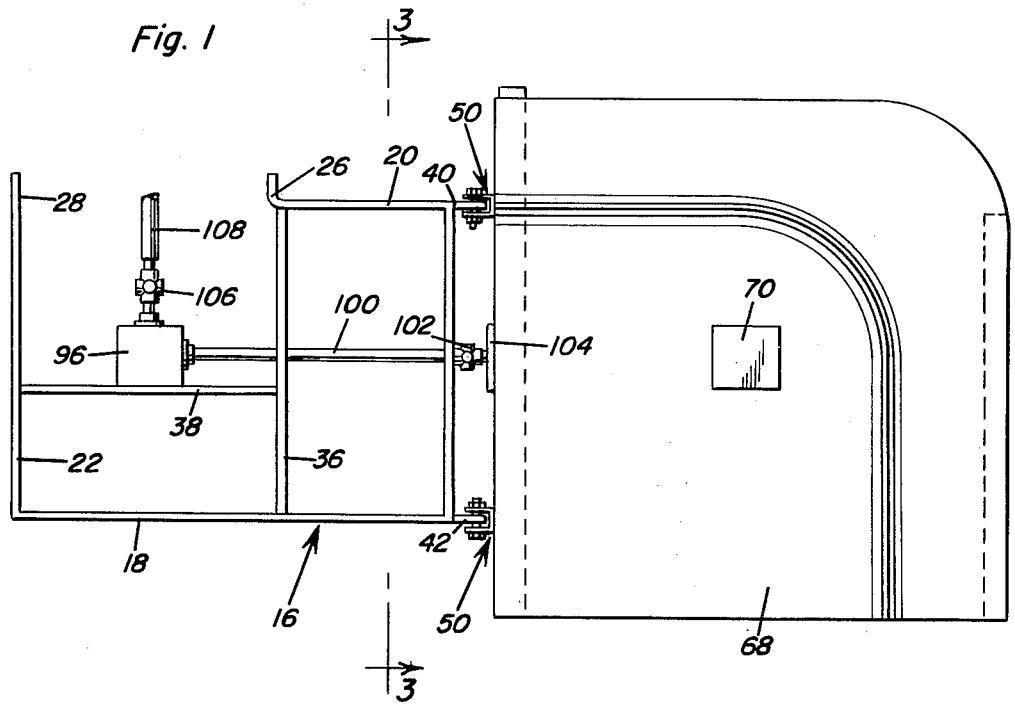
FIGURE 1 is a top plan view of the shredder comprising the instant invention.
Figure 2:
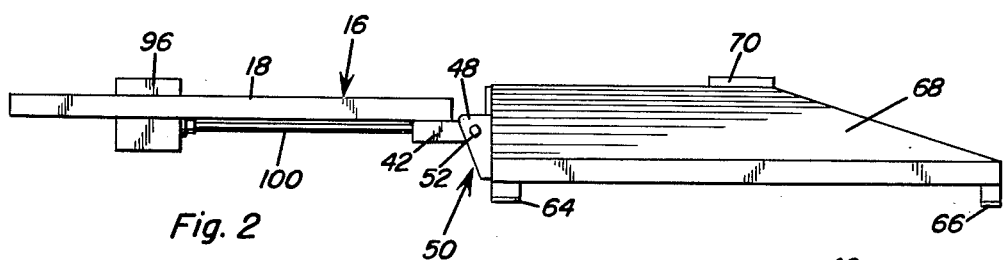
FIGURE 2 is a side elevational view of the shredder shown in FIGURE 1.
Figure 3:
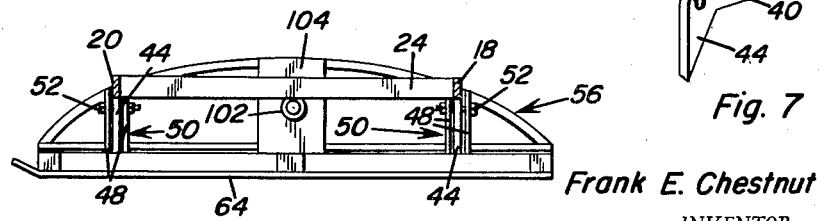
FIGURE 3 is a longitudinal vertical sectional view taken substantially upon the plane indicated by the section line 3—3 of FIGURE 1.
Figure 7:
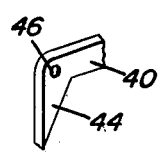
FIGURE 7 is an enlarged fragmentary perspective view of a portion of the lift frame showing the manner in which the cutter assembly may be rotated about a longitudinally extending horizontally disposed axis extending along one side of the lift frame.

With particular attention directed to FIGURE 7 of the drawings it will be noted that the outer end portions of each of the arms 40 and 42 terminate in downturned portions 44. The outer extremities of the arms 40 and 42 are suitably apertured as at 46 and these outer extremities are pivotally secured to and between the furcations 48 of the bifurcated mounting brackets which are generally designated by the reference numeral 50. The furcations 48 are each suitably apertured and a pivot pin 52 is secured between each pair of furcations 48 and the associated outer extremity of the mounting arms 40 and 42.

The bight portion 54 of the mounting brackets 50 are engaged by the downturned portions 44 of the mounting arms 40 and 42 to limit the downward movement of the outer end of the cutter housing frame 56 to which the mounting brackets 50 are secured.

The cutter housing frame 56 includes a generally rectangular framework 58 provided with suitable cross bracing 60 and 62. Also, the housing frame 56 includes a pair of depending longitudinally extending runners 64 and 66 which are each adapted to engage the surface of the ground over which the cutter housing frame passes when in the horizontally disposed position.

It will be noted, see FIGURES 1 through 3 and FIGURES 5 and 6, that the cutter housing frame 56 includes a protective cover assembly 68 whose purpose will hereinafter become apparent.

A first gear box generally referred to by the reference numeral 70 is supported in the cutter housing frame 56 by means of cross bracing 60 and 62 and the gear box 70 includes an input shaft 72 and an output shaft 74 which are operatively connected by means of suitable gearing (not shown) disposed in the gear box 70. When the cutter housing frame 56 is horizontally disposed, the output shaft 74 is substantially vertically disposed and a mounting plate 76 is fixedly secured to the lower end thereof by means of suitable fastening means 78. A pair of blades 80 and 82 each having an aperture 84 formed in one end which receives the shoulder 84 of a shouldered fastener 90. The mounting plate 76 is apertured as at 92 on radii of the plate and the fasteners 90 are secured to the apertures 92 by means of suitable fasteners 94. It will be noted that the shoulder portion 86 is of a greater length than the thickness of the blades 80 and that the blades 80 are therefore pivotally secured to the mounting plate 76 by means of the fasteners 90. By pivotally securing the blades 80 and 82 to the mounting disk 76 at their inner ends, should the outer ends of either of the blades 80 or 82 strike an object offering great resistance, the blade striking the object will then pivot about the associated fastener 90 until that blade is able to pass by the object in its path.

A second gear box 96 is carried by the cross brace 38 of the lift frame 16 and it also includes input and output shafts which are designated by the reference numerals 98 and 100, respectively. The shafts 72 and 100 are substantially aligned when the cutter housing frame 56 is horizontally disposed, and the adjacent ends of shafts 72 are spaced slightly from each other and connected by means of a universal joint 102. It will be noted, see FIGURES 1 and 3, that the universal joint 102 lies substantially on the axis of rotation of the cutter housing frame 56 and therefore operation of the cutter blades 80 and 82 is possible even if the lift frame 16 is disposed at an angle relative to the cutter housing frame 56.

A vertically disposed journal plate 104 is carried by the side of the cutter housing frame 56 adjacent the lift frame 16 and it journals the end of the shaft 72 adjacent the universal joint 102 to minimize any possibility of either of the shafts 72 or 100 whipping and causing damage to the gear boxes 70 and 96. The input shaft 98 is adapted for securement to a universal joint 106 carried by the rear end of an intermediate shaft 108 which is operatively connected to the power take-off (not shown) of the tractor 12.

With particular attention again directed to FIGURE 7 of the drawings it will be noted that the outer extremity of the mounting arms 40 and 42 are rounded to provide clearance between the bight portion 54 of the mounting brackets 50 so that the cutter housing frame 56 may be rotated to an upstanding position.

In operation, the arms 26 and 28 are secured to the lift arms 32 and 34 of the two point lift 14 in any convenient manner and the universal joint 106 is coupled to the input shaft 98 of the second gear box 96. If it is desired to use the weed shredder 10, the cutter housing frame 56 is rotated to a horizontally disposed position along one side of the tractor 12 as illustrated in FIGURES 5 and 6 of the drawings. The tractor 12 may then be operated and the power take-off may be placed in gear to effect movement of the cutter blades 80 and 82.

It will be noted from viewing FIGURE 6 of the drawings that the weed shredder 10 is particularly well adapted to pass beneath low hanging limbs of trees and shrubbery. The ability of the weed shredder to pass beneath extremely low limbs has proven greatly beneficial in fruit orchards and the like where heavily laden tree limbs are disposed very close to the ground. It is extremely important that high grass and weeds be removed from beneath these extremely low hanging branches in order that the fruit being carried thereby may have access to sun light and properly ripen together with the fruit on the higher portions of the tree.

When it is desired to move the tractor 12 through narrow places and over rough ground, the cutter housing frame 56 is rotated to a substantially upstanding position along the side of the lift frame 16 to which it is secured and the lift frame 16 may then be lifted upon operation of the two point lift 14 to provide the desired ground clearance.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A weed shredder for use with a tractor having a two point lift and a power take-off, said shredder comprising a lift frame adapted to the rear of a tractor and provided with a pair of forwardly extending arms including means on their forward ends adapted for pivotal securement to the lift arms of said tractor for rotation about axes extending transversely of said arms, a cutter housing, means pivotally securing said cutter housing to said lift frame along one side thereof for free swinging movement about a horizontally disposed axis paralleling said arms between a first horizontally disposed position projecting laterally from said one side of said lift frame and a second upstanding position along said one side of said lift frame, a rotary cutter having a vertical axis journaled in said cutter frame, drive means operatively connected to said rotary cutter and adapted for engagement with the power take-off of the tractor to which the weed shredder is attached, said cutter housing and lift frame including coacting rigid stop means limiting upward and downward swinging movement of the free edge of said cutter housing, said drive means including a plurality of interconnected drive shafts, two of said drive shafts being disposed at right angles to the axis of rotation of the cutter housing and disposed on opposite sides of said last mentioned axis, a universal joint secured between the adjacent ends of said two drive shafts, the axis of rotation of said cutter housing passing through said universal joint, and a pair of depending longitudinally extending skids secured to opposite sides of said cutter housing adapted to engage the ground over which the shredder passes when in said first position.

2. The combination of claim 1 wherein said rotary cutter includes a vertically extending shaft, a mounting plate secured to the lower end of said shaft, at least one pair of cutter blades, means pivotally securing one end of each of said cutter blades to said mounting plate along radii thereof.

3. A weed shredder for use with a tractor having a two-point lift and a power take-off, said shredder comprising a lift frame adapted to be positioned to the rear of a tractor and provided with a pair of forwardly extending arms including means on their forward ends adapted for pivotal securement to the lift arms of said tractor for rotation about axes extending transversely of said arms, a cutter housing, means pivotally securing said cutter housing to said lift frame along one side thereof for free swinging movement about a horizontally disposed axis paralleling said arms between a first horizontally disposed position projecting laterally from said one side of said lift frame and a second upstanding position along said one side of said lift frame, a rotary cutter having a vertical axis journaled in said cutter frame, drive means operatively connected to said rotary cutter and adapted for engagement with the power take-off of the tractor to which the weed shredder is attached, said cutter housing and said lift frame including coacting rigid stop means limiting upward and downward swinging movement of the free edge of said cutter housing, said drive means including a pair of gear boxes each having input and output shafts disposed at right angles relative to each other, one of said gear boxes carried by said cutter housing with its output shaft vertically disposed and its input shaft horizontally disposed and extending towards said lift frame when said housing is in said first position, the other gear box carried by said lift frame and having its output shaft substantially aligned with the input shaft of said one gear box and its input shaft extending forwardly and adapted for engagement with said power take-off, the adjacent ends of said one gear box input shaft and said other gear box output shaft being slightly spaced apart, a universal joint secured between said adjacent ends, the axis of rotation of said cutter housing passing through said universal joint, and a pair of depending longitudinally extending skids secured to opposite sides of said housing adapted to engage the ground over which the shredder passes when in said first position.

References Cited in the file of this patent
UNITED STATES PATENTS

| | | |
|---|---|---|
| 2,791,081 | Allen et al. | May 7, 1957 |
| 2,952,961 | Engler | Sept. 20, 1960 |